US009041766B1

(12) United States Patent
Gates et al.

(10) Patent No.: US 9,041,766 B1
(45) Date of Patent: May 26, 2015

(54) AUTOMATED ATTENTION DETECTION

(71) Applicant: CA, INC., Islandia, NY (US)

(72) Inventors: Carrie E. Gates, New York, NY (US); Gabriel M. Silberman, Hastings-on-Hudson, NY (US); Maria C. Velez-Rojas, San Jose, CA (US); Serguei Mankovskii, San Ramon, CA (US); Steven L. Greenspan, Dallas, TX (US)

(73) Assignee: CA, INC., New York, NY (US)

( * ) Notice: Subject to any disclaimer, the term of this patent is extended or adjusted under 35 U.S.C. 154(b) by 43 days.

(21) Appl. No.: 13/829,621

(22) Filed: Mar. 14, 2013

(51) Int. Cl.
*H04N 7/15* (2006.01)
*H04N 7/14* (2006.01)

(52) U.S. Cl.
CPC ..................................... *H04N 7/147* (2013.01)

(58) Field of Classification Search
CPC ....... H04N 7/13; H04N 5/232; G11B 27/034; G03B 29/00
USPC .......... 340/573.1; 348/65; 382/164; 709/203; 715/202, 723, 733
See application file for complete search history.

(56) References Cited

U.S. PATENT DOCUMENTS

| | | | | |
|---|---|---|---|---|
| 4,289,053 A * | 9/1981 | Sawamura | ...................... | 83/62.1 |
| 4,837,594 A * | 6/1989 | Nakamura et al. | ............... | 396/81 |
| 5,923,371 A * | 7/1999 | Iijima | ........................... | 348/356 |
| 6,700,618 B1 * | 3/2004 | Chubachi | ...................... | 348/354 |
| 6,775,247 B1 | 8/2004 | Shaffer | | |
| 7,106,204 B2 * | 9/2006 | Pilu et al. | ................... | 340/573.1 |
| 7,579,845 B2 * | 8/2009 | Peschmann et al. | .......... | 324/637 |
| 7,840,898 B2 * | 11/2010 | Hua et al. | ...................... | 715/723 |
| 8,136,944 B2 | 3/2012 | De Lemos | | |
| 8,180,826 B2 * | 5/2012 | Hua et al. | ...................... | 709/203 |
| 8,196,032 B2 * | 6/2012 | Hua et al. | ...................... | 715/202 |
| 8,219,438 B1 | 7/2012 | Moon | | |
| 8,235,725 B1 | 8/2012 | Hill | | |
| 8,358,215 B2 * | 1/2013 | Asad et al. | ................. | 340/573.1 |
| 8,395,656 B1 * | 3/2013 | Malzbender et al. | ...... | 348/14.16 |
| 8,564,443 B2 * | 10/2013 | Asad et al. | ................. | 340/573.1 |

(Continued)

OTHER PUBLICATIONS

M. Bishop, D. Frincke, C. Gates and F. Greitzer (2009) AZALIA: and A to Z Assesment of the Likelihood of Insider Attack. In Proceedings of the 2009 IEEE International Conference on Technologies for Homeland Security. Waltham, MA. May 11-12, 2009.

(Continued)

*Primary Examiner* — Gerald Gauthier
(74) *Attorney, Agent, or Firm* — Vierra Magen Marcus LLP

(57) ABSTRACT

Methods for providing feedback information regarding a person's focus of attention during a live video communication are described. The live video communication may comprise a live video conference. The feedback information may correspond with non-verbal cues such as who a speaking person is looking at when they are speaking and whether a listener is paying attention to the speaking person. In some embodiments, a dominant speaker in a live video conference may be determined and a live video stream that is being viewed by the dominant speaker may be identified. An identification of the live video stream may be transmitted to computing devices associated with other participants in the live video conference. Images associated with the live video stream being displayed to the other participants may be highlighted, enlarged, or moved to a different location on displays used by the other participants.

20 Claims, 11 Drawing Sheets

(56) References Cited

U.S. PATENT DOCUMENTS

| | | |
|---|---|---|
| 2007/0066916 A1 | 3/2007 | Lemos |
| 2007/0275762 A1 | 11/2007 | Aaltone |
| 2008/0260212 A1 | 10/2008 | Moskal |
| 2008/0261636 A1 | 10/2008 | Lau |
| 2009/0281990 A1 | 11/2009 | Greenspan |
| 2011/0307408 A1 | 12/2011 | Gates |
| 2012/0143693 A1 | 6/2012 | Chung |
| 2012/0236107 A1 | 9/2012 | Rosenberg |
| 2012/0274754 A1* | 11/2012 | Tsuruoka .......... 348/65 |
| 2012/0288189 A1* | 11/2012 | Hu et al. .......... 382/164 |
| 2012/0291106 A1 | 11/2012 | Sasaki |
| 2012/0297305 A1* | 11/2012 | Hehmeyer et al. .......... 715/733 |
| 2013/0120522 A1 | 5/2013 | Lian |

OTHER PUBLICATIONS

U.S. Appl. No. 13/829,604, filed Mar. 14, 2013.
Office Action dated Oct. 10, 2014, U.S. Appl. No. 13/829,604.
Response to Office Action dated Jan. 12, 2015, U.S. Appl. No. 13/829,604.
Notice of Allowance dated Mar. 25, 2015, U.S. Appl. No. 13/829,604.

* cited by examiner

AUTOMATED ATTENTION DETECTION

BACKGROUND

This disclosure relates to systems and methods for enhancing a live video communication.

High speed Internet access has enabled the widespread use of videoconferencing (or virtual meetings) as a means of communication between groups of people located around the world. Videoconferencing may involve simultaneous (or near simultaneous) two-way video and/or audio communication between users of different computing devices located in different geographic locations. Many personal computing devices, such as desktop computers, laptop computers, tablet computers, and mobile phones, provide the ability to capture video (e.g., using a front-facing camera), transmit the captured video to the Internet, and to display multiple real-time video streams associated with other computing devices. These personal computing devices allow groups of people to engage in virtual face-to-face meetings on short notice even they are located in different geographic locations.

BRIEF SUMMARY

According to one aspect of the present disclosure, technology for enhancing a live video communication by providing information regarding a person's focus of attention is disclosed.

One embodiment comprises a method comprising transmitting a live video stream to a plurality of computing devices. The plurality of computing devices is associated with a plurality of persons. The method further comprises determining whether a first subset of the plurality of persons has stopped paying attention to the live video stream, generating an alert in response to determining that the first subset has stopped paying attention to the live video stream, and transmitting the alert to a first person of the first subset.

One embodiment comprises a system comprising a storage device and a processor in communication with the storage device. The storage device stores a user profile associated with a first person of a plurality of persons. The plurality of persons is associated with a plurality of computing devices. The processor transmits a live video stream to the plurality of computing devices and determines whether a first subset of the plurality of persons has stopped paying attention to the live video stream. The first subset includes the first person. The processor generates an alert in response to determining that the first subset has stopped paying attention to the live video stream and causes the alert to be transmitted to the first person.

One embodiment comprises a computer program product comprising a computer readable storage medium having computer readable program code embodied therewith. The computer readable program code configured to transmit a live video stream to a plurality of computing devices. The plurality of computing devices is associated with a plurality of persons. The computer readable program code configured to determine whether a first subset of the plurality of persons has stopped paying attention to the live video stream, generate an alert in response to determining that the first subset has stopped paying attention to the live video stream, and transmit the alert to a first person of the first subset.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
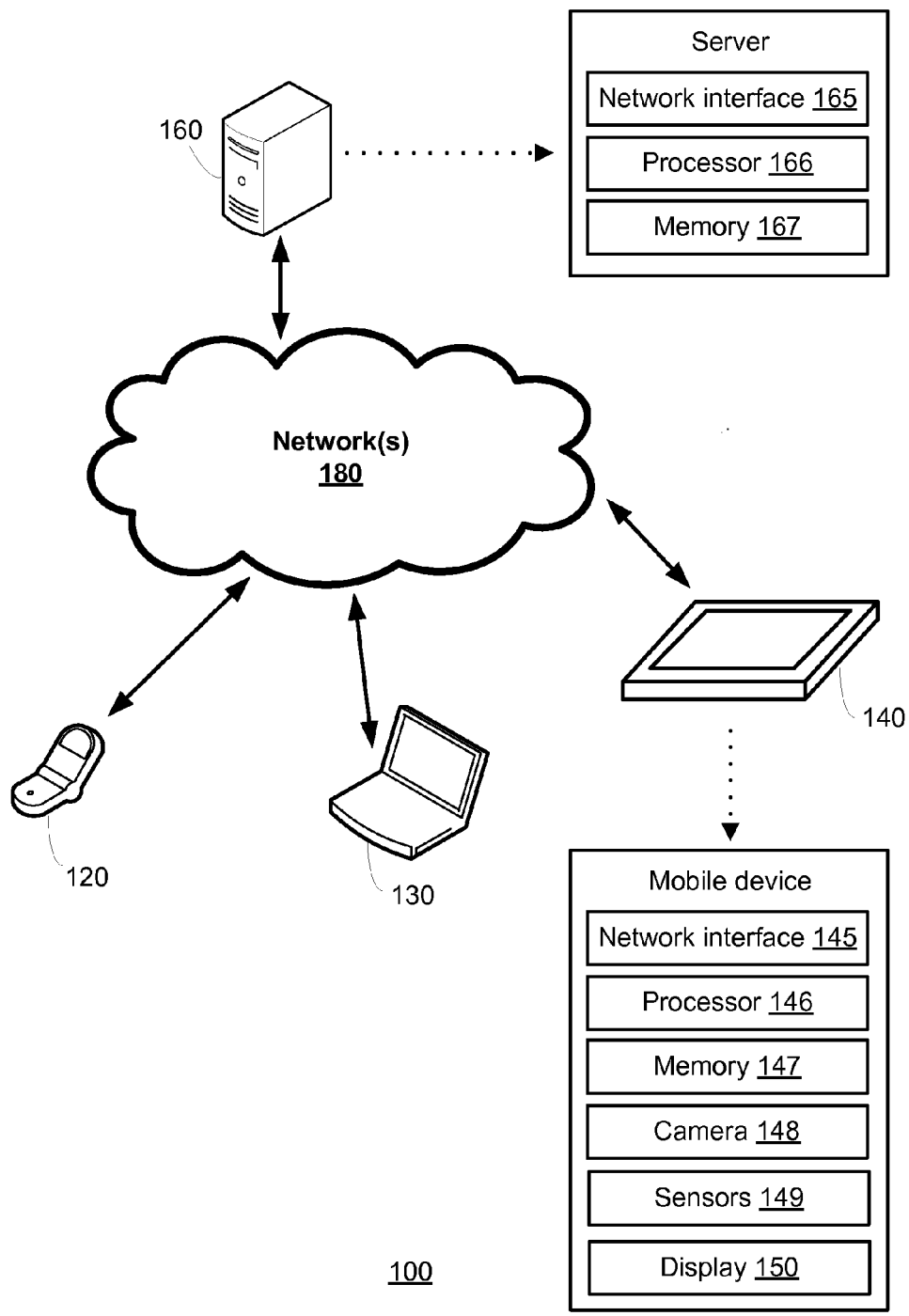
FIG. 1 depicts one embodiment of a networked computing environment.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET or the like, conventional procedural programming languages, such as the "C" programming language, Visual Basic, Fortran 2003, Perl, Python, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Technology is described for providing feedback information regarding a person's focus of attention during a live video communication. The live video communication may comprise a simultaneous two-way video communication such as a live video conference. The feedback information may correspond with non-verbal cues such as who a speaking person is looking at when they are speaking and whether a listener is paying attention to the speaking person. In some embodiments, a dominant speaker in a live video conference may be determined and a live video stream that is being viewed by the dominant speaker may be identified. An identification of the live video stream being viewed by the dominant speaker may be transmitted to computing devices associated with other participants in the live video conference. Images associated with the live video stream being displayed to the other participants may be highlighted (e.g., using a highlighting color or virtual pointer), enlarged, or moved to a different location on displays used by the other participants. In some cases, additional feedback information may be provided to the dominant speaker regarding whether one or more of the other participants in the live video conference are paying attention to the live video conference.

One issue with communicating with a group of people using live video streams is that non-verbal communication associated with a person's eye contact and focus of attention, that naturally occurs during a live face-to-face meeting, may be lost. These non-verbal cues communicate important information during a conversation such as who a speaking person is looking at when they are speaking and whether a listener is paying attention to the speaking person. Thus, there is a need to provide feedback information associated with non-verbal communication during a live video communication.

Another issue with communicating with a large group of people using live video streams is that network congestion may prevent the live video streams from being viewed in real-time (i.e., a large number of live video streams may cause freezing of the live video streams). In some embodiments, a server hosting a live video conference may allocate a higher bandwidth to live video streams associated with a subset of the people actively involved in the live video conference (e.g., the people most engaged in a conversation) and allocate a lower bandwidth to others who are not actively involved in the live video conference in order to help relieve network congestion and prevent the freezing of live video streams during the live video conference.

FIG. 1 depicts one embodiment of a networked computing environment 100 in which the disclosed technology may be practiced. Networked computing environment 100 includes a plurality of computing devices interconnected through one or more networks 180. The one or more networks 180 allow a particular computing device to connect to and communicate with another computing device. The depicted computing devices include mobile device 120, mobile device 130, mobile device 140, and server 160. In some embodiments, the plurality of computing devices may include other computing devices not shown. A computing device may comprise various computing devices such as a mobile phone, laptop computer, desktop computer, or tablet computer. In some embodiments, the plurality of computing devices may include more than or less than the number of computing devices shown in FIG. 1. The one or more networks 180 may include a secure network such as an enterprise private network, an unsecure network such as a wireless open network, a local area network (LAN), a wide area network (WAN), and the Internet. Each network of the one or more networks 180 may include hubs, bridges, routers, switches, and wired transmission media such as a wired network or direct-wired connection.

A server, such as server 160, may allow a client to download information (e.g., text, audio, image, and video files) from the server or to perform a search query related to particular information stored on the server. In some cases, server 160 may act as a mail server or a file server. In general, a "server" may include a hardware device that acts as the host in a client-server relationship or a software process that shares a resource with or performs work for one or more clients. Communication between computing devices in a client-server relationship may be initiated by a client sending a request to the server asking for access to a particular resource or for particular work to be performed. The server may subsequently perform the actions requested and send a response back to the client.

One embodiment of server 160 includes a network interface 165, processor 166, and memory 167, all in communication with each other. Network interface 165 allows server 160 to connect to one or more networks 180. Network interface 165 may include a wireless network interface, a modem, and/or a wired network interface. Processor 166 allows server 160 to execute computer readable instructions stored in memory 167 in order to perform processes discussed herein. In some cases, the server 160 may establish a secure connection with one or more computing devices (e.g., using a virtual private network connection). Processor 166 may comprise one or more processing elements (e.g., multiple CPUs). In one embodiment, server 160 may comprise a server for facilitating a live video conference.

One embodiment of mobile device 140 includes a network interface 145, processor 146, memory 147, camera 148, sensors 149, and display 150, all in communication with each other. Network interface 145 allows mobile device 140 to connect to one or more networks 180. Network interface 145 may include a wireless network interface, a modem, and/or a wired network interface. Processor 146 allows mobile device 140 to execute computer readable instructions stored in memory 147 in order to perform processes discussed herein. Camera 148 may capture images or video. Sensors 149 may generate motion and/or orientation information associated with mobile device 140. Sensors 149 may comprise an inertial measurement unit (IMU). Display 150 may display digital images and/or videos. Display 150 may comprise a touchscreen display.

In some embodiments, various components of mobile device 140 including the network interface 145, processor 146, memory 147, camera 148, and sensors 149 may be integrated on a single chip substrate. In one example, the network interface 145, processor 146, memory 147, camera 148, and sensors 149 may be integrated as a system on a chip (SOC). In other embodiments, the network interface 145, processor 146, memory 147, camera 148, and sensors 149 may be integrated within a single package.

In some embodiments, mobile device 140 may provide a natural user interface (NUI) by employing camera 148, sensors 149, and gesture recognition software running on processor 146. With a natural user interface, a person's body parts and movements may be detected, interpreted, and used to control various aspects of a computing application. In one example, a computing device utilizing a natural user interface may infer the intent of a person interacting with the computing device (e.g., that the end user has performed a particular gesture in order to control the computing device).

Networked computing environment 100 may provide a cloud computing environment for one or more computing devices. Cloud computing refers to Internet-based computing, wherein shared resources, software, and/or information are provided to one or more computing devices on-demand via the Internet (or other global network). The term "cloud" is used as a metaphor for the Internet, based on the cloud drawings used in computer networking diagrams to depict the Internet as an abstraction of the underlying infrastructure it represents.

In some embodiments, a mobile device, such as mobile device 140, may be in communication with a server in the cloud, such as server 160, and may provide to the server authentication information (e.g., a password associated with an end user of the mobile device) and/or user identification information (e.g., an alphanumeric user identifier) associated with the end user. In response, the server may transmit to the mobile device security protected data accessible by the end user. In one embodiment, the authentication information may be automatically determined by the mobile device based on biometric characteristics of the end user. In another embodiment, the authentication information may be automatically determined by the mobile device based on the identification of various biometric characteristics of the end user, as well as the detection of various gestures performed by the end user, and other factors such as the location of the mobile device.

In some embodiments, networked computing environment 100 may provide remote access to secure documents and applications to employees of a company (or members of an organization) in order to allow them to work without being physically present at a company location (e.g., to enable an employee to work from home or while traveling). To facilitate remote access to the secure documents and applications, a secure network connection may be established using a virtual private network (VPN). A VPN connection may allow an employee to securely access or transmit data from a private network (e.g., from a company file server or mail server) using an unsecure public network or the Internet. The VPN connection typically requires client-side software (e.g., running on the employee's remote computing device) to establish and maintain the VPN connection. The VPN client software may provide data encryption and encapsulation prior to the transmission of secure private network traffic through the Internet.

In some embodiments, a live video conference in which a plurality of participants are engaged may be provided by a plurality of computing devices connected through one or more networks, such as one or more networks 180. Each of the plurality of computing devices may include a camera, such as camera 148 of mobile device 140, for capturing one of the live video streams for the live video conference. A first computing device of the plurality of computing devices may determine a dominant speaker in the live video conference and identify a particular live video stream that is being viewed by the dominant speaker. An identification of the particular live video stream being viewed by the dominant speaker may be transmitted to other computing devices of the plurality of computing devices associated with other participants in the live video conference. Images associated with the particular live video stream being displayed to the other participants may be highlighted, enlarged, or moved to different locations on displays used by the other participants.

Figure 2A:
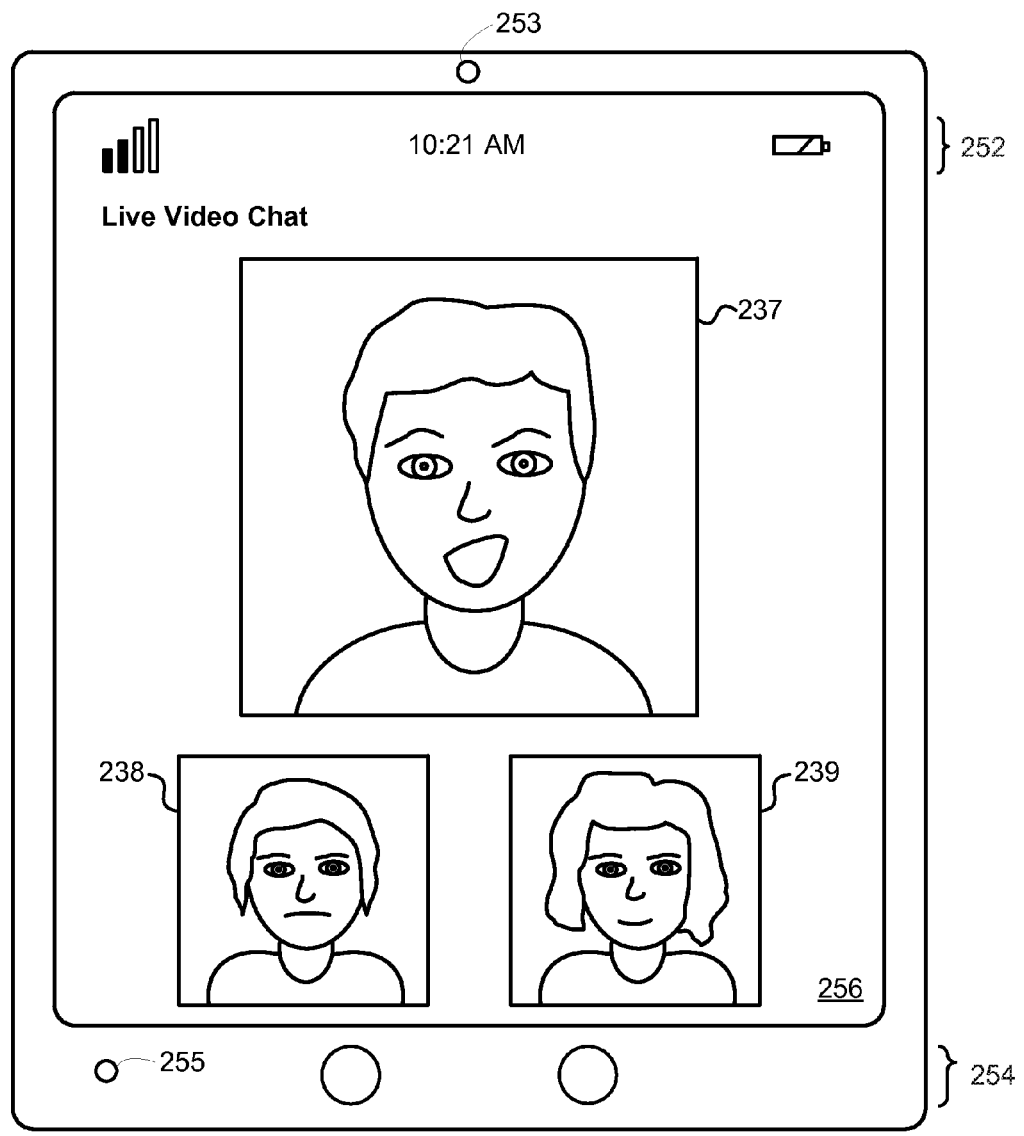
FIG. 2A depicts one embodiment of a mobile device running a client application.

FIG. 2A depicts one embodiment of mobile device 140 of FIG. 1 running a client application. As depicted, mobile device 140 includes a touchscreen display 256, physical control buttons 254, a microphone 255, and a front-facing camera 253. The touchscreen display 256 may include an LCD display for presenting a user interface to an end user of the mobile device. The touchscreen display 256 may include a status area 252 which provides information regarding signal strength, time, and battery life associated with the mobile device. The microphone 255 may capture audio associated with the end user (e.g., the end user's voice) for determining the identity of the end user and for detecting particular words spoken by the end user. The front-facing camera 253 may be used to capture images of the end user for determining the identity of the end user and for detecting facial expressions performed by the end user. The mobile device may include wireless connectivity for transmitting video information captured by the front-facing camera 253 and/or audio information captured by microphone 255 to another computing device.

In one embodiment, the client application may comprise a computing application for enabling a live video conference. The client application may cause a plurality of live video streams to be displayed to the end user of the mobile device. The client application may acquire a plurality of images associated with the end user (e.g., captured using front-facing camera 253) and determine where the end user is looking and whether the end user is focused on a particular live video stream of the plurality of live video streams displayed to the end user. In some cases, the client application may apply image processing techniques to the plurality of images in order to perform gaze detection and/or eye tracking for the end user. The image processing techniques may isolate various features of the end user's eyes. For example, the image processing techniques (e.g., edge detection and pattern matching) may identify the end user's irises and/or pupils and may determine positions of the isolated features relative to a facial orientation of the end user. After extracting the eye features, template matching may be used to identify the centers of the end user's irises and to determine the position of the end user's irises relative to the corners of the end user's eyes. In some cases, a gaze vector associated with the end user's direction of focus may be determined using images captured from more than one front-facing camera. An estimation of the gaze vector may be improved using multiple front-facing cameras to triangulate facial features of the end user for determining the facial orientation of the end user and/or eye orientations of the end user.

As depicted in FIG. 2A, three live video streams 237-239 associated with a live video conference are displayed on touchscreen display 256. Live video stream 237 corresponds with a dominant speaker of a conversation during the live video conference. In one example, the dominant speaker may be determined as the person who has spoken the most during the last five seconds of the conversation. Live video streams 238-239 correspond with other participants in the live video conference. The live video stream 237 corresponding with the current dominant speaker may be enlarged and/or positioned in a region of the touchscreen display 256 assigned to dominant speakers of a conversation. In some cases, the live video stream 237 may be highlighted (e.g., using a colored box or spotlight feature). The live video streams 237-239 may be displayed as moveable tiles on the touchscreen display 256.

Figure 2B:
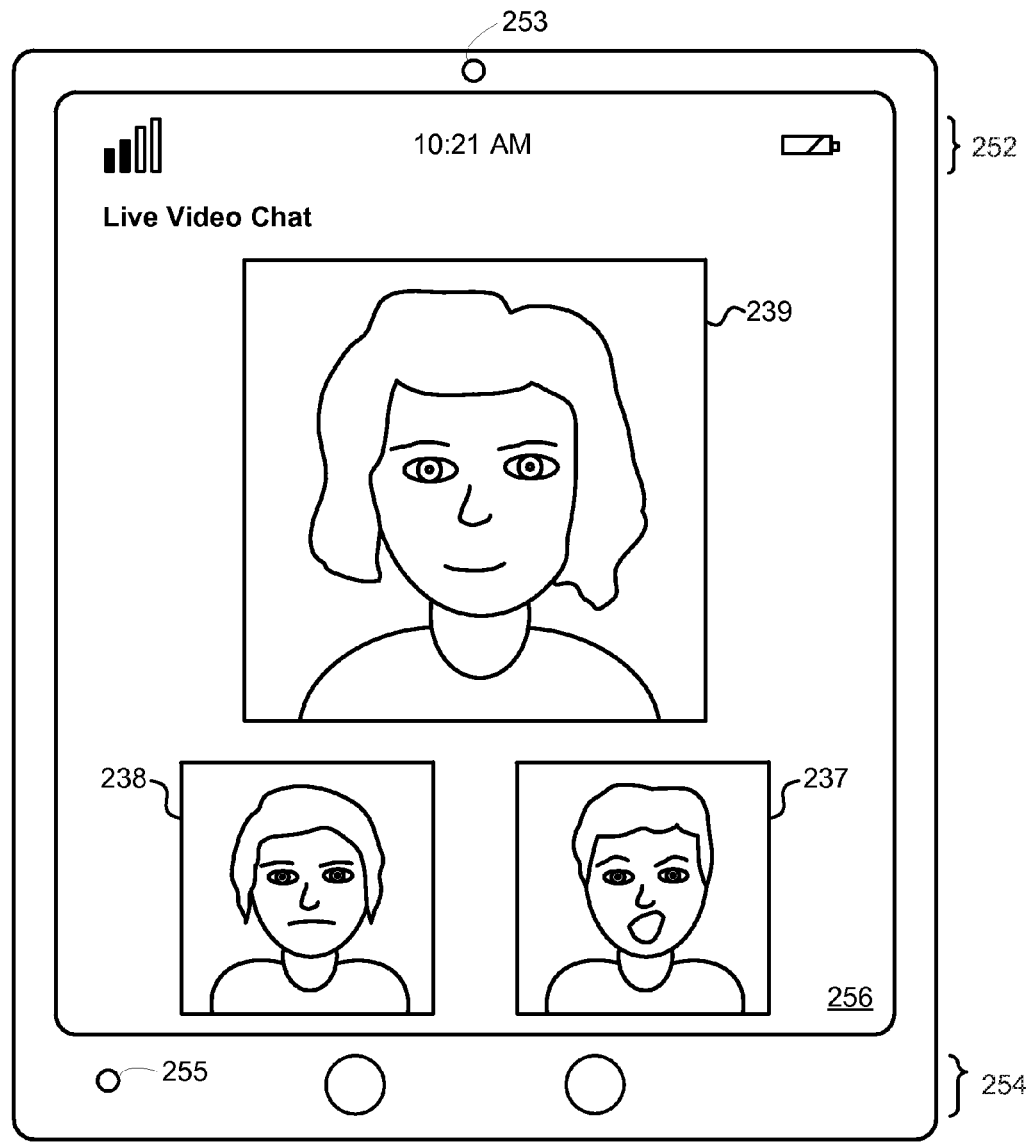
FIG. 2B depicts one embodiment of a second mobile device running a client application.

FIG. 2B depicts one embodiment of mobile device 141 running a client application. As depicted, three live video streams 237-239 associated with the live video conference depicted in FIG. 2A are displayed on touchscreen display 256. Live video stream 237 corresponds with the dominant speaker of the conversation during the live video conference. In one example, the dominant speaker may be determined as the person who has spoken the most during the last three seconds of the conversation. Live video streams 238-239 correspond with other participants in the live video conference. Live video stream 239 corresponds with the live video stream that is being viewed by the dominant speaker. In one example, the live video stream that is viewed the most by the dominant speaker during the last three seconds of the conversation may be identified and transmitted to computing devices associated with the participants in the live video conference. The live video stream 239 corresponding with the current person being spoken to by the current dominant speaker may be enlarged and/or positioned in a region of the touchscreen display 256 assigned to live video streams that are being viewed by the dominant speaker during the live video conference. In some cases, the live video stream 239 may be highlighted (e.g., using a colored box or spotlight feature). The live video streams 237-239 may be displayed as moveable tiles on the touchscreen display 256.

Figure 2C:
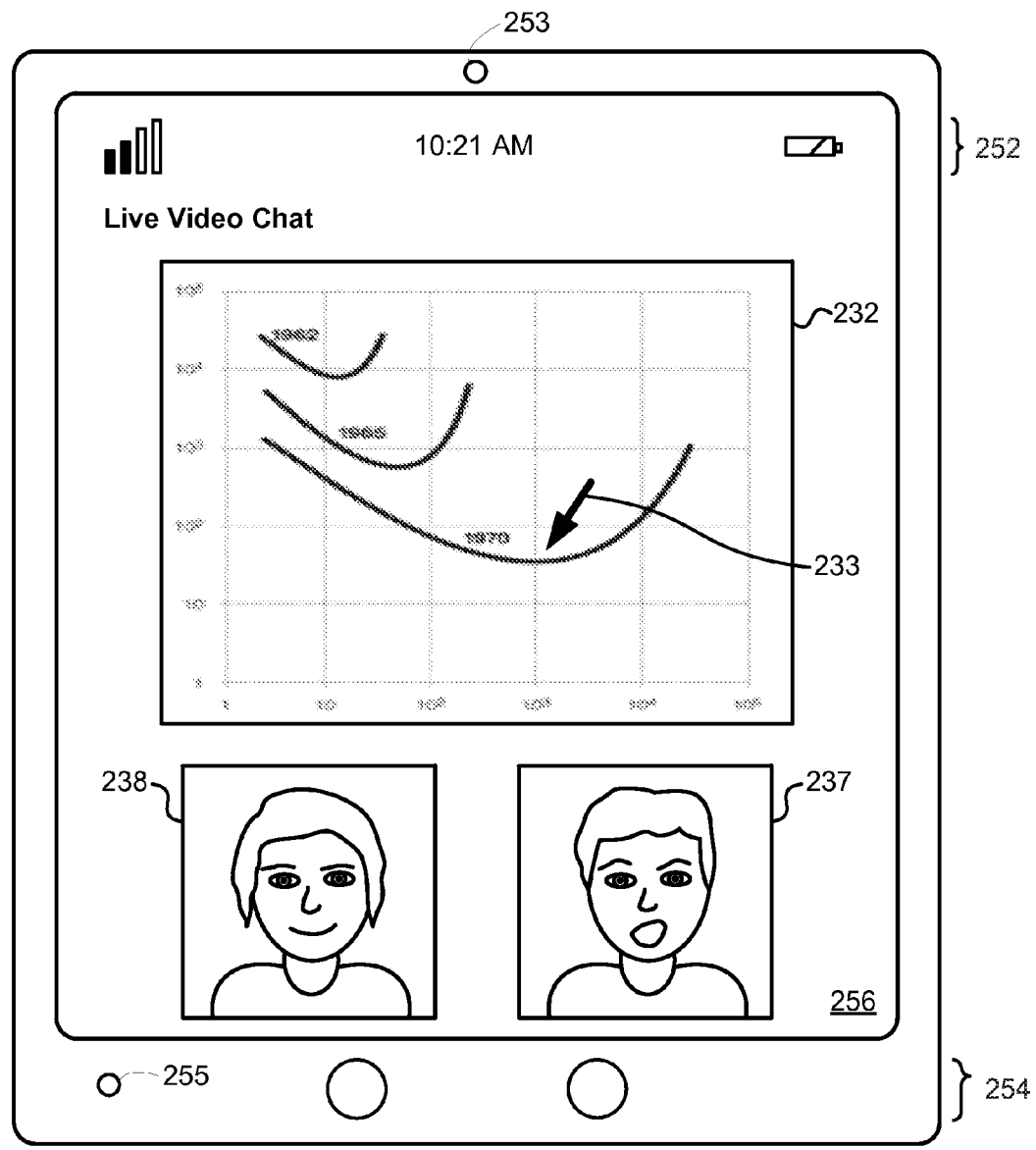
FIG. 2C depicts one embodiment of a mobile device running a client application.

FIG. 2C depicts one embodiment of mobile device 140 of FIG. 1 running a client application. As depicted, three live video streams 232 and 237-238 associated with a live video conference are displayed on touchscreen display 256. Live video stream 232 corresponds with a video presentation (e.g., a video lecture) associated with the live video conference. In one example, the video presentation may comprise a real-time educational lecture or a real-time business presentation. Live video stream 232 may display slides associated with the video presentation. Live video streams 237-238 correspond with other participants of the live video conference. As depicted, a "highlight" pointer 233 may highlight or point to a focus point focused on by the lecturer or dominant speaker of the video presentation. In one example, the pointer 233 may point to a location on the display associated with the average location that the dominant speaker of the live video conference focused on during the last five seconds of the live video conference.

Figure 2D:
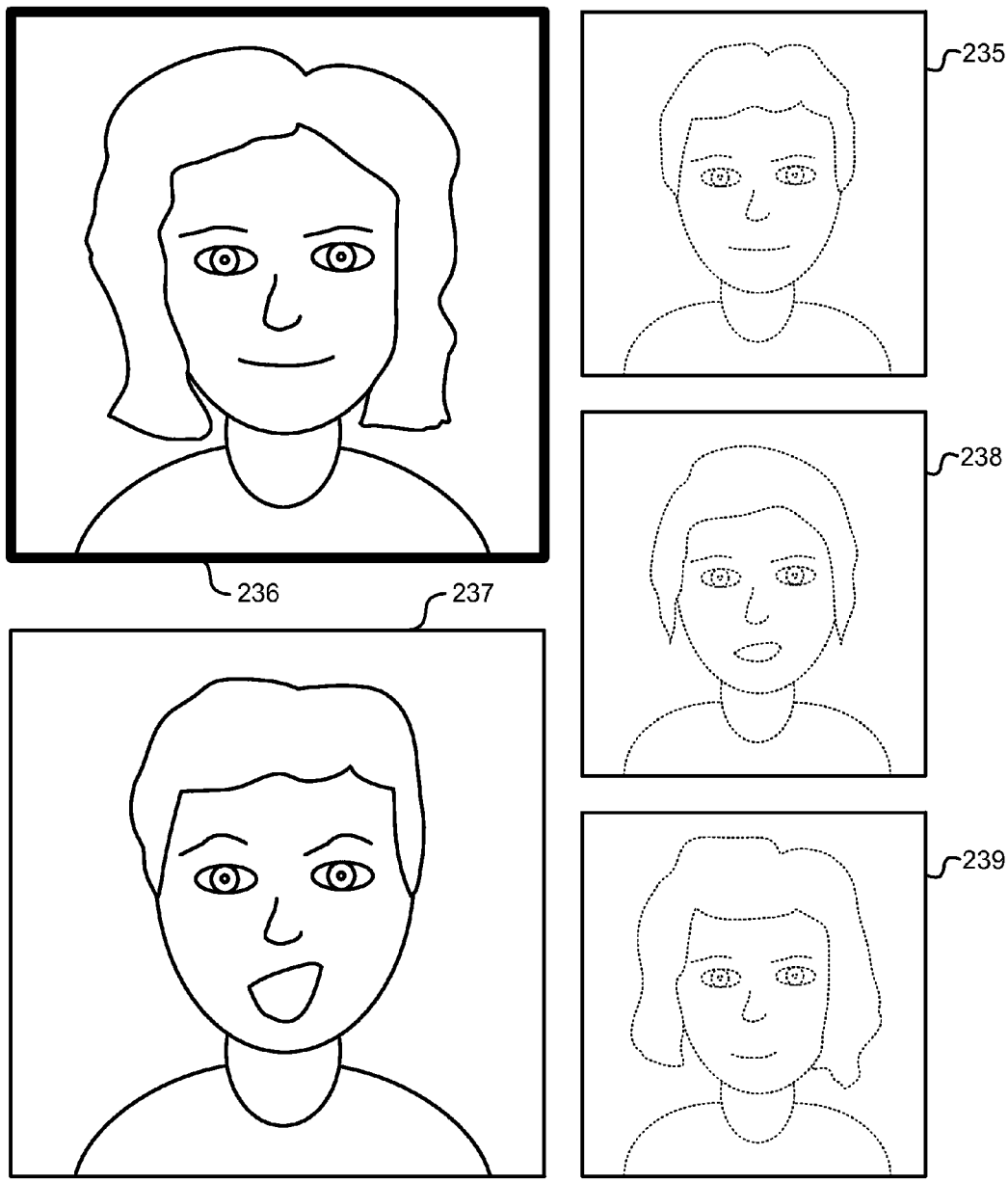
FIG. 2D depicts one embodiment of a display displaying five live video streams associated with a live video conference.

FIG. 2D depicts one embodiment of a display displaying five live video streams 235-239 associated with a live video conference. As depicted, live video stream 237 corresponds with the current dominant speaker, live video stream 236 corresponds with the current person being spoken to by the current dominant speaker, and live video streams 235 and 238-239 correspond with other participants in the live video conference. Images associated with the live video stream 236 may be highlighted or bolded in order to provide feedback information regarding the dominant speaker's focus of attention during the live video communication. Images associated with the live video streams 235 and 238-239 may be frozen, slowed-down, or "greyed-out" in order to provide feedback information regarding the participants that are not actively engaged in the live video conference.

In some embodiments, a first live video stream associated with a current dominant speaker may be highlighted using a first highlight (e.g., using a colored box of a first color around the first live video stream) and a second live video stream associated with a person being spoken to by the current dominant speaker may be highlighted using a second highlight different from the first highlight (e.g., using a colored box of a second color different from the first color around the second live video stream). In some cases, the first live video stream may be highlighted using a first virtual pointer (e.g., using a first color and/or first shape) and the second live video stream may be highlighted using a second virtual pointer different from the first virtual pointer (e.g., using a second color and/or second shape).

In some embodiments, one or more live streams associated with a live video conference may be highlighted depending on which of the live streams are being viewed by various conference participants. In one example, a first set of participants may be identified (e.g., an end user may identify three participants out of ten conference participants) and the live video streams being viewed by each of the first set of participants may be identified (e.g., by using different highlighting colors or virtual pointers associated with each of the participants).

Figure 3A:
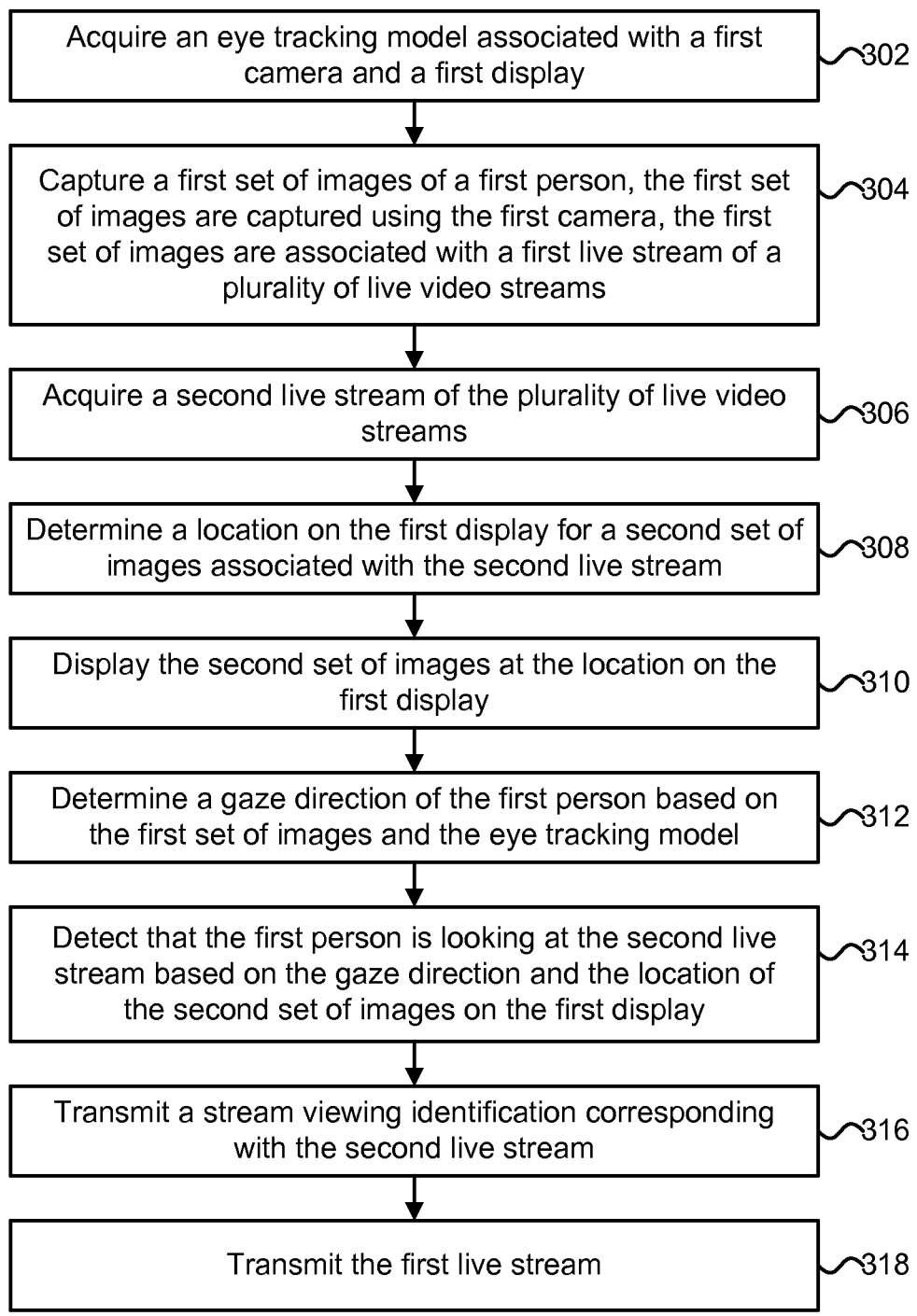
FIG. 3A is a flowchart describing one embodiment of a process for enhancing a live video communication.

FIG. 3A is a flowchart describing one embodiment of a process for enhancing a live video communication. In one embodiment, the process of FIG. 3A is performed by a mobile device, such as mobile device 140 in FIG. 1.

In step 302, an eye tracking model associated with a first camera and a first display is acquired. In one embodiment, the first camera and the first display, such as front-facing camera 253 and touchscreen display 256 of FIG. 2A, may be integrated with a computing device. In other embodiments, the first camera and the first display may correspond with components of a computing environment (e.g., a desktop computing environment or a laptop computing environment) wherein the first display comprises a monitor used for displaying content and/or a graphical user interface of the computing environment. The first camera may be attached to the monitor or positioned at a fixed point within the computing environment.

In some embodiments, the eye tracking model may comprise a model for determining a gaze direction associated with a person viewing the first display (or locations within the first display) from a reference point associated with the first camera. The eye tracking model may comprise a plurality of calibration images associated with a person viewing different regions or locations of the first display. In one embodiment, the plurality of calibration images may be captured by the first camera given a training sequence presented to the person or a sample set of people. The training sequence may comprise a virtual fingertip that is moved to different locations of the first display at different times. For example, the virtual fingertip (or other virtual pointer) may begin at a top left corner of the first display, move to the top right corner of the first display, move in a zigzag pattern to the bottom left corner of the first display, and then move to the bottom right corner of the first display. A plurality of training sequences may be used corresponding with different face orientations. The eye tracking model may comprise different sets of calibration images based on different orientations of a person's face relative to the first display.

In some cases, machine learning techniques may be used to determine a gaze direction associated with an image of the person viewing the first display using the plurality of calibration images. The machine learning techniques may use training sets comprising the plurality of calibration images. In some cases, the machine learning techniques may use neural networks or support vector machines.

In one embodiment, an image of a person viewing a location on the first display may be captured using the first camera and a gaze direction associated with the person may be determined by applying interpolation techniques to calibration images associated with the eye tracking model. Before applying the interpolation techniques, image processing techniques may be applied to the image (e.g., edge detection and pixel thresholding techniques) in order to identify particular eye features (e.g., the irises and/or pupils of the person's eyes).

In step 304, a first set of images of a first person are captured. The first set of images may be captured using the first camera. The first camera may comprise a front-facing camera on a mobile device or a desktop computing device. The first set of images may be associated with a first live stream of a plurality of live video streams. The plurality of live video streams may correspond with live video streams used for providing simultaneous (or near simultaneous) two-way communication. The plurality of live video streams may correspond with a live video conference.

In step 306, a second live stream of the plurality of live video streams is acquired. The second live stream may be received at a first computing device corresponding with the first camera. In step 308, a location on the first display for a second set of images associated with the second live stream is determined. In one embodiment, the second live stream may correspond with a dominant speaker (e.g., a person who has spoken the most during a particular time period prior to receiving the second live stream). In one example, the dominant speaker may comprise a person associated with the second live stream that has spoken the most during the past 15 seconds of a live video conference. The determination of the dominant speaker (or a ranking of speakers) of a live video conference may be determined by applying audio signal processing techniques to audio signals associated with the plurality of live video streams. Each of the plurality of live video streams may include video information and audio information.

In one embodiment, in the case that the second live stream corresponds with the dominant speaker, then the location on the first display may correspond with an enlarged area on the first display assigned to dominant speakers. In another embodiment, in the case that the second live stream corresponds with a second person that is being viewed or looked at by the dominant speaker, then the location on the first display may correspond with a second enlarged area on the first display assigned to people being viewed by the dominant speaker. One embodiment of a process for determining a location for images associated with a live video stream on a display is described later in reference to FIG. 3B.

In step 310, the second set of images is displayed at the location on the first display. In step 312, a gaze direction of the first person is determined based on the first set of images and the eye tracking model. The gaze direction may correspond with a direction in which the first person is looking. In one embodiment, the gaze direction of the first person may be determined by applying machine learning techniques to the first set of images based on the eye tracking model. In another embodiment, the gaze direction of the first person may be determined by estimating a face orientation of the first person by applying 3D facial orientation techniques to the first set of images, determining an eye orientation based on the face orientation and the first set of images (e.g., by extracting features of the eyes), and then determining the closest matching image of a plurality of calibration images based on the eye orientation.

In step 314, it is detected that the first person is looking at the second live stream based on the gaze direction and the location of the second set of images on the first display. In one embodiment, the gaze direction may correspond with a vector that intersects with a plane of the first display. The point on the first display at which the vector intersects the plane may be compared with the location of the second set of images determined in step 308. As the first person viewing the first display may have the ability to move images associated with different live video streams over time, the corresponding location of images associated with a particular live stream may change over time (e.g., live video stream tiles may be moved by the first person during a live video conference).

In step 316, a stream viewing identification corresponding with the second live stream is transmitted. The stream viewing identification may identify the live stream that is being viewed by the first person. In one embodiment, a computing device used by the first person may broadcast or transmit to a server providing a live video conference an identification of the live video stream that is being viewed by the first person at regular intervals throughout the live video conference. In one example, stream viewing identifications may be transmitted every second or every five seconds during the live video conference. The stream viewing identifications may be used by other computing devices used by other participants to determine what the people associated with different live video streams are looking at during the live video conference. In step 318, the first live stream is transmitted. The first live stream may be transmitted by a computing device used by the first person to a server hosting or otherwise providing the live video conference.

Figure 3B:
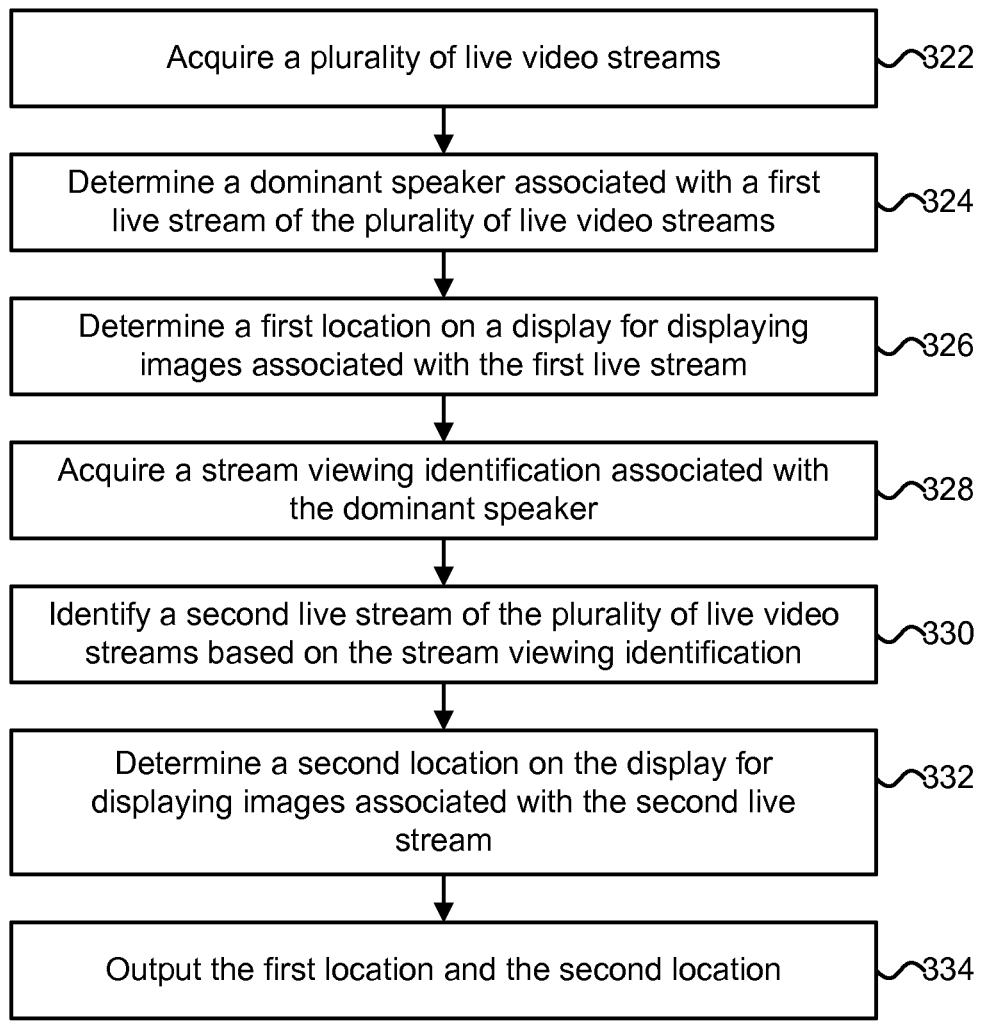
FIG. 3B is a flowchart describing one embodiment of a process for determining a location for images associated with a live video stream on a display.

FIG. 3B is a flowchart describing one embodiment of a process for determining a location for images associated with a live video stream on a display. The process described in FIG. 3B is one example of a process for implementing step 308 in FIG. 3A. In one embodiment, the process of FIG. 3B is performed by a mobile device, such as mobile device 140 in FIG. 1.

In step 322, a plurality of live video streams is acquired. The plurality of live video streams may be acquired from a server that is used to host or provide a live video conferencing session. Each of the plurality of live video streams may correspond with a different person. Each of the plurality of live video streams may correspond with a different address associated with a video chat service.

In step 324, a dominant speaker associated with the first live stream of the plurality of live video streams is determined. The dominant speaker may correspond with a person who has spoken the most during a particular time period during a live video conference. In one example, the dominant speaker may comprise the person that has spoken the most during the past ten seconds of a live video conference. The dominant speaker may be determined by applying audio signal processing techniques to audio signals associated with the plurality of live video streams. Each of the plurality of live video streams may include video information and audio information.

In step 326, a first location on a display for displaying images associated with the first live stream is determined. In one embodiment, the first location may correspond with a location assigned to dominant speakers. The first location may correspond with an enlarged region of the display assigned to dominant speakers. In step 328, a stream viewing identification associated with the dominant speaker is acquired. The stream viewing identification may comprise an identification of the live stream that is being viewed by the dominant speaker.

In step 330, a second live stream of the plurality of live video streams is identified based on the stream viewing identification. The second live stream may correspond with the person that is being viewed the most by the dominant speaker during a particular time period during a live video conference. In step 332, a second location on the display for displaying images associated with the second live stream is determined. In one embodiment, the second location may correspond with a location assigned to people that are being looked at by dominant speakers. The second location may correspond with an enlarged region of the display assigned to people that are being viewed by dominant speakers while the dominant speakers are speaking. In step 334, the first location and the second location are outputted. The first location and the second location may be used by a client side voice conferencing application to determine the placement of images corresponding with live video streams on a display.

Figure 3C:
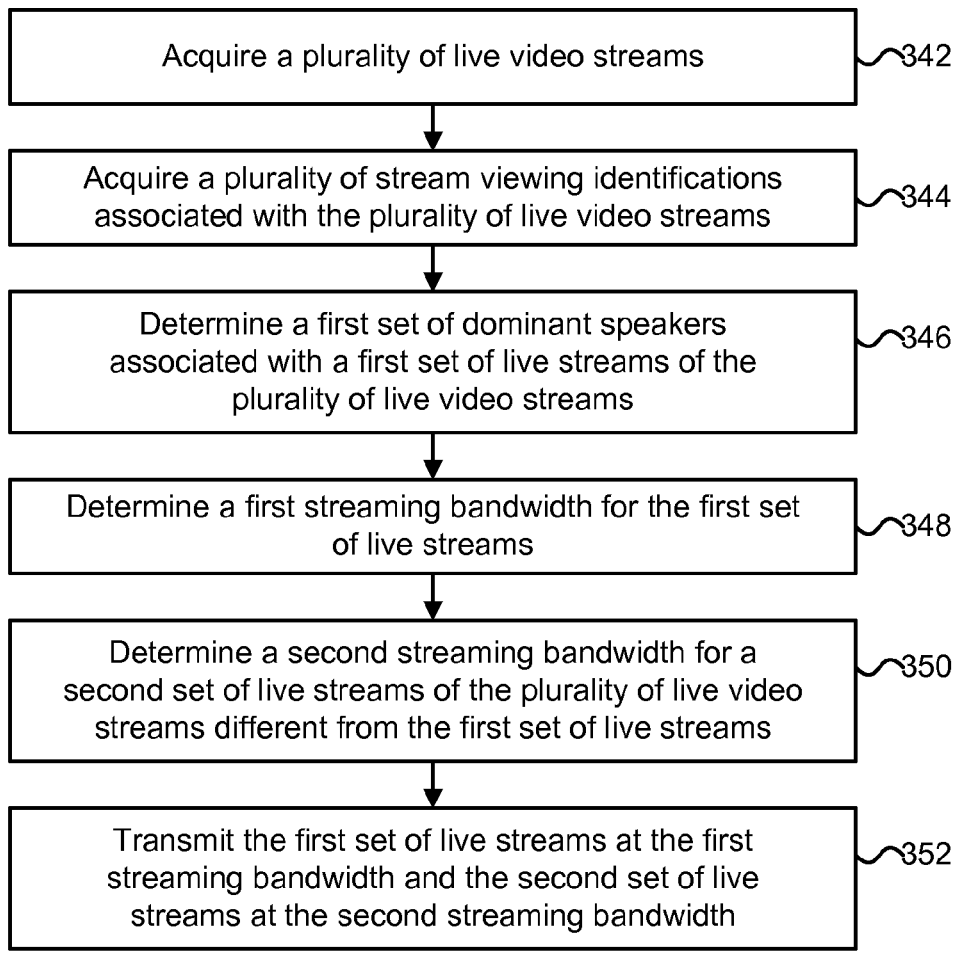
FIG. 3C is a flowchart describing one embodiment of a process for enhancing a live video communication.

FIG. 3C is a flowchart describing one embodiment of a process for enhancing a live video communication. In one embodiment, the process of FIG. 3C is performed by a server, such as server 160 in FIG. 1.

In step 342, a plurality of live video streams is acquired. The plurality of live video streams may be received at a video conferencing server, such as server 160 in FIG. 1. The plurality of live video streams may correspond with video transmissions from a plurality of computing devices. Each of the plurality of live video streams may correspond with a different person. Each of the plurality of live video streams may correspond with a different computing device of the plurality of computing devices.

In step 344, a plurality of stream viewing identifications associated with the plurality of live video streams is acquired. The plurality of stream viewing identifications may be received at a video conferencing server, such as server 160 and FIG. 1. The plurality of stream viewing identifications may provide identifications of which live video streams are being viewed by each person participating in a live video conference. In one example, a live video conference may involve five people, each of whom is participating in the live video conference, and the plurality of stream viewing identifications may comprise five different stream viewing identifications associated with each of the five different people. Each of the stream viewing identifications may originate from a computing device used by each of the five different people and be transmitted to the server hosting the live video conference at periodic intervals (e.g., transmitted every five seconds during the live video conference).

In step 346, a first set of dominant speakers associated with a first set of live streams of the plurality of live streams is determined. The first set of dominant speakers may correspond with a group of people who have spoken the most during a particular time period during a live video conference. In one example, the first set of dominant speakers may comprise the top two people who have spoken the most during the past ten seconds of a live video conference. The first set of dominant speakers may be determined by applying audio signal processing techniques to audio signals associated with the plurality of live video streams. Each of the plurality of live video streams may include video information and audio information.

In step 348, a first streaming bandwidth for the first set of live streams is determined. In step 350, a second streaming bandwidth for a second set of live streams of the plurality of live video streams is determined. The first set of live streams may be different from the second set of live video streams. In one embodiment, the second set of live streams may correspond with the remaining live video streams of the plurality of live video streams excluding the first set of live streams.

In some embodiments, the first streaming bandwidth may be set to a high streaming bandwidth (e.g., 30 Mbit/s or 3 Mbit/s) and the second streaming bandwidth may be set to a low streaming bandwidth less than the high streaming bandwidth (e.g., 0.3 Mbit/s). In one example, the first streaming bandwidth may be assigned a transmitting speed that is ten times faster than the second streaming bandwidth. Allocating a higher bandwidth to a subset of the people involved in a live video conference who are most engaged in a conversation and allocating a lower bandwidth to others who are not actively involved in the conversation during a particular period of time may help relieve network congestion and prevent the freezing of live video streams.

In step 352, the first set of live streams is transmitted at the first streaming bandwidth and the second set of live streams is transmitted at the second streaming bandwidth. The first set of live streams and the second set of live streams may be transmitted from a server hosting a live video conference to a plurality of computing devices associated with people involved in the live video conference.

Figure 4A:
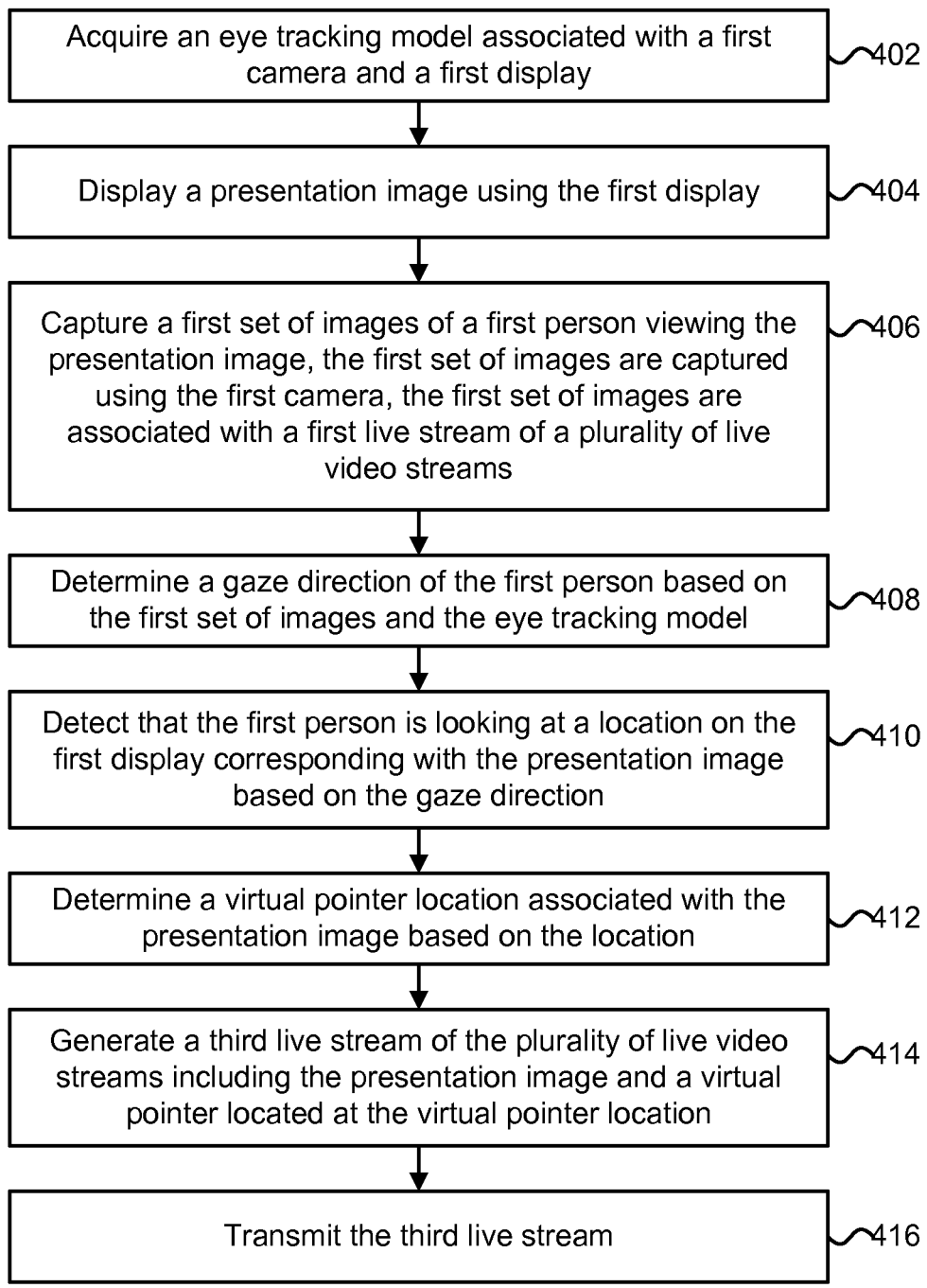
FIG. 4A is a flowchart describing one embodiment of a process for transmitting a live video stream including a virtual pointer.

FIG. 4A is a flowchart describing one embodiment of a process for transmitting a live video stream including a virtual pointer. The process described in FIG. 4A is one example of a process for implementing step 422 in FIG. 4B. In one embodiment, the process of FIG. 4A is performed by a mobile device, such as mobile device 140 in FIG. 1.

In step 402, an eye tracking model associated with a first camera and a first display is acquired. In one embodiment, the first camera and the first display, such as front-facing camera 253 and touchscreen display 256 of FIG. 2A, may be integrated with a computing device. In other embodiments, the first camera and the first display may correspond with components of a computing environment (e.g., a desktop computing environment or a laptop computing environment) wherein the first display comprises one of a number of monitors used for displaying content and/or a graphical user interface within the computing environment. The first camera may be attached to the monitor or positioned at a fixed point within the computing environment.

In some embodiments, the eye tracking model may comprise a model for determining a gaze direction associated with a person viewing the first display (or locations within the first display) from a reference point associated with the first camera. The eye tracking model may comprise a plurality of calibration images associated with a person viewing different regions or locations of the first display. In one embodiment, the plurality of calibration images may be captured by the first camera given a training sequence presented to the person or a sample set of people. The training sequence may comprise a virtual fingertip that is moved to different locations of the first display at different times. For example, the virtual fingertip (or other virtual pointer) may begin at a top left corner of the first display, move to the top right corner of the first display, move in a zigzag pattern to the bottom left corner of the first display, and then move to the bottom right corner of the first display. A plurality of training sequences may be used corresponding with different face orientations of the person. The eye tracking model may comprise different sets of calibration images based on different orientations of the person's face relative to the first display.

In some cases, machine learning techniques may be used to determine a gaze direction associated with an image of the person viewing the first display using the plurality of calibration images. The machine learning techniques may use training sets comprising the plurality of calibration images. In some cases, the machine learning techniques may use neural networks or support vector machines.

In step 404, a presentation image is displayed using the first display. In one embodiment, the presentation image may comprise a presentation slide associated with a live video presentation. In step 406, a first set of images of a first person viewing the presentation image are captured. The first set of images may be captured using the first camera. The first camera may comprise a front-facing camera on a mobile device or a desktop computing device fixed in position relative to the first display. In one embodiment, the first set of images may be associated with a first live stream of a plurality of live video streams. The plurality of live video streams may correspond with live video streams used for providing simultaneous (or near simultaneous) two-way communication. The plurality of live video streams may correspond with a live video conference.

In step 408, a gaze direction of the first person is determined based on the first set of images and the eye tracking model. The gaze direction may correspond with a direction in which the first person is looking. In one embodiment, the gaze direction of the first person may be determined by applying machine learning techniques to the first set of images based on the eye tracking model. In another embodiment, the gaze direction of the first person may be determined by estimating a face orientation of the first person by applying 3D facial orientation techniques to the first set of images (e.g., by extracting and identifying facial features of the first person), determining an eye orientation based on the face orientation and the first set of images, and then determining the closest matching image of a plurality of calibration images based on the eye orientation.

In step 410, it is detected that the first person is looking at a location on the first display corresponding with the presentation image based on the gaze direction determined in step 408. In one embodiment, the gaze direction may correspond with a vector that intersects with a plane of the first display. The point on the first display at which the vector intersects the plane may be used to determine the location on the first display corresponding with the presentation image. In one example, the presentation image may comprise a presentation slide and the location on the first display corresponding with the presentation image may correspond with a location on the presentation slide associated with particular text or a particular image (e.g., text located at a bottom left corner of the presentation slide).

In step 412, a virtual pointer location associated with the presentation image is determined based on the location. In step 414, a third live stream of the plurality of live video streams is generated including the presentation image and one or more images of a virtual pointer located at the virtual pointer location. The virtual pointer may comprise an arrow, circle, spotlight, or other symbols for identifying a point of interest on the presentation image. In step 416, the third live stream is transmitted. The third live stream may be transmitted by a computing device used by the first person to a server hosting a live video conference.

Figure 4B:
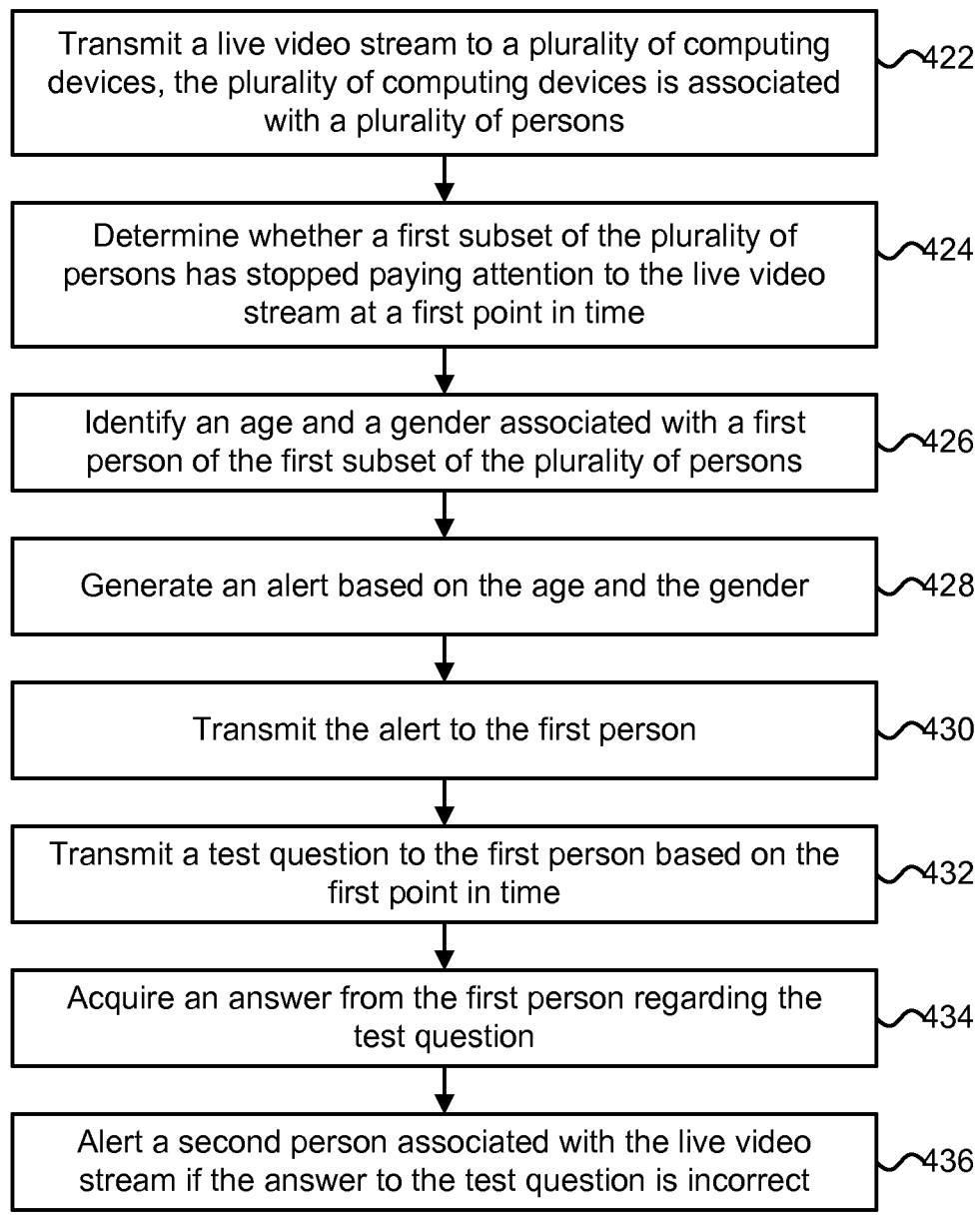
FIG. 4B is a flowchart describing one embodiment of a process for generating alerts based on whether a person is paying attention during a live video communication.

FIG. 4B is a flowchart describing one embodiment of a process for generating alerts based on whether a person is paying attention during a live video conference. In one embodiment, the process of FIG. 4B is performed by a server, such as server 160 in FIG. 1.

In step 422, a live video stream is transmitted to a plurality of computing devices. The plurality of computing devices may be associated with a plurality of persons. In one embodiment, the plurality of persons may comprise a group of students and the live video stream may comprise a real-time lecture. In another embodiment, the live video stream may comprise a tutorial that is part of a compliance regulation (e.g., a tutorial regarding employee ethics within a workplace). One embodiment of a process for transmitting a live video stream including a virtual pointer was described previously in reference to FIG. 4A.

In step 424, it is determined whether a first subset of the plurality of persons has stopped paying attention to the live video stream at a first point in time. In one example, the first point in time may correspond with a slide or group of slides discussing a particular subject during a real-time lecture. It may be determined that the first subset of the plurality of persons (e.g., a group comprising more than three students) has stopped paying attention to the live video stream by performing eye tracking and gaze detection techniques on images captured from cameras capturing the first subset of the plurality of persons during the real-time lecture. In one embodiment, a person may be deemed to not be paying attention to a live video presentation if the person looks away from a display displaying the live video presentation for more than a particular period of time (e.g., looks away for more than ten seconds).

In some embodiments, upon detecting that the first subset of the plurality of persons has stopped paying attention to the live video stream, a test (e.g., a test including one or more questions covering material associated with the live video stream) may be provided to the first subset. In other embodiments, upon detecting that the first subset of the plurality of persons has stopped paying attention to the live video stream, live video streams being transmitted to computing devices associated with the first subset may be paused and then restarted upon detection that the first subset has started paying attention.

In step 426, an age and a gender associated with a first person of the first subset of the plurality of persons are identified. The age and gender may be identified by acquiring a user profile associated with the first person. In step 428, an alert is generated based on the age and the gender. In one embodiment, the alert may comprise a sound, a video, and/or warning text provided to the first person. In some cases, as women may be better at sensing color than men, if the first person is identified as a woman, then the alert may involve a change in color associated with the live video stream. In other cases, as men may be better than women at sensing movement, if the first person is identified as a man, then the alert may involve the movement of a headline or banner associated with the live video stream or the playing of an animation.

In some embodiments, if the first person is identified as being older than a particular age, then the alert may involve displaying a text notification to the first person. If the first person is identifies as being younger than a particular age, then the alert may involve displaying an animation to the first person.

In step 430, the alert is transmitted to the first person. In step 432, a test question is transmitted to the first person. In one embodiment the test question transmitted to the first person may correspond with the first point in time (i.e., a point in time when the first subset of the plurality of persons stopped paying attention to the live video stream). As an example, the first point in time may correspond with one or more slides of a real-time lecture and the test question may correspond with subject matter covered in the one or more slides.

In step 434, an answer from the first person regarding the test question is acquired. The answer may comprise a selection of an answer choice to a multiple choice question. In step 436, a second person associated with the live video stream is alerted if the answer to the test question is incorrect. In one embodiment, the second person may comprise a teacher or lecturer associated with the live video stream. In some embodiments, the second person may be alerted once a threshold number of viewers (e.g., more than five students) have answered test questions incorrectly. In some embodiments, the live video stream may be paused (or temporarily frozen) upon the detection that a threshold number of viewers have answered test questions incorrectly.

Figure 5:
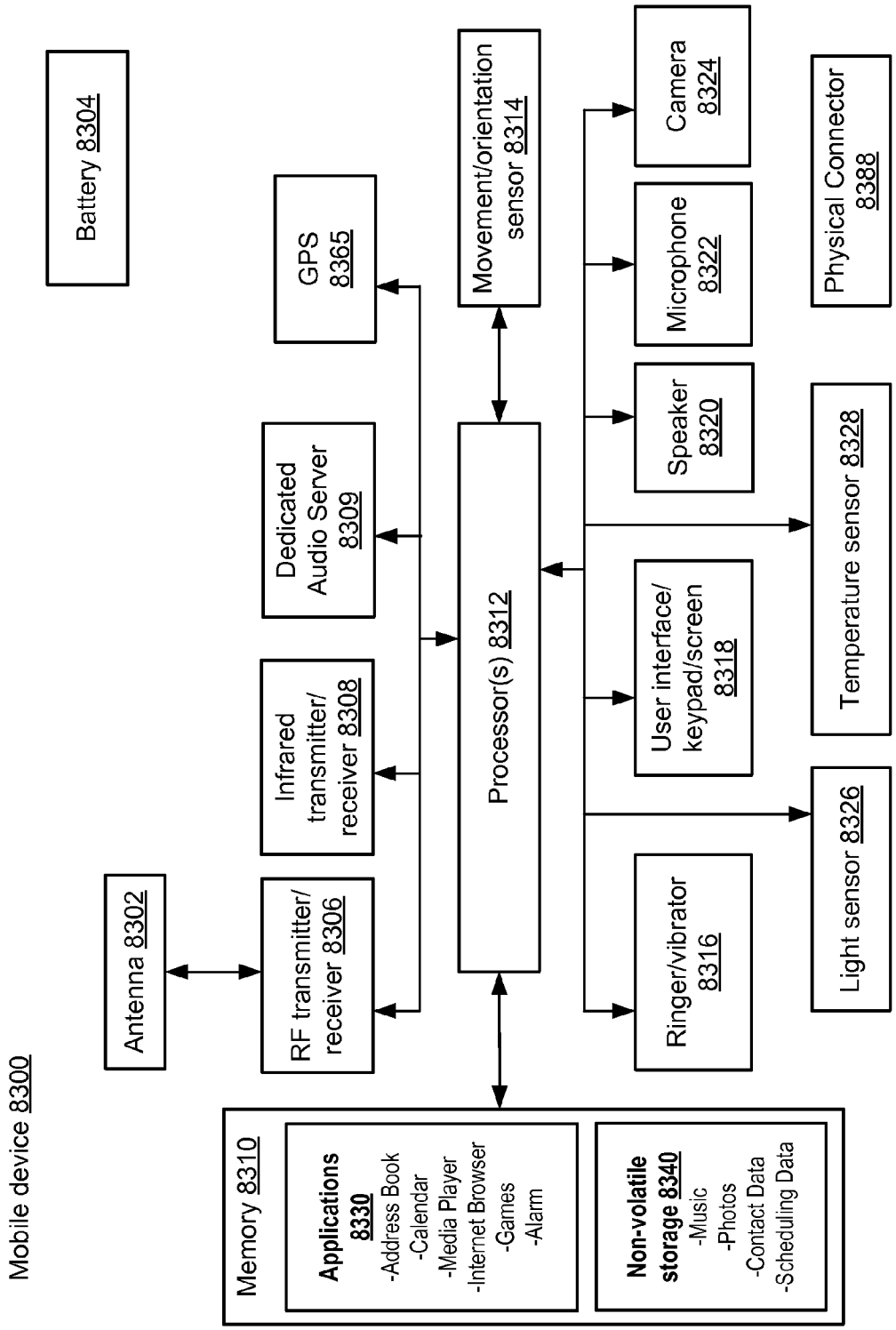
FIG. 5 depicts one embodiment of a mobile device.

The disclosed technology may be used with various computing systems. FIG. 5 depicts one embodiment of a mobile device 8300, which includes one example of a mobile implementation for mobile device 140 in FIG. 1. Mobile devices may include laptop computers, pocket computers, mobile phones, personal digital assistants, tablet computers, and handheld media devices that have been integrated with wireless receiver/transmitter technology.

Mobile device 8300 includes one or more processors 8312 and memory 8310. Memory 8310 includes applications 8330 and non-volatile storage 8340. Memory 8310 can be any variety of memory storage media types, including non-volatile and volatile memory. A mobile device operating system handles the different operations of the mobile device 8300 and may contain user interfaces for operations, such as placing and receiving phone calls, text messaging, checking voicemail, and the like. The applications 8330 can be any assortment of programs, such as a camera application for photos and/or videos, an address book, a calendar application, a media player, an internet browser, games, an alarm application, and other applications. The non-volatile storage component 8340 in memory 8310 may contain data such as music, photos, contact data, scheduling data, and other files.

The one or more processors 8312 also communicates with dedicated audio server 8309, with RF transmitter/receiver 8306 which in turn is coupled to an antenna 8302, with infrared transmitter/receiver 8308, with global positioning service (GPS) receiver 8365, and with movement/orientation sensor 8314 which may include an accelerometer and/or magnetometer. RF transmitter/receiver 8308 may enable wireless communication via various wireless technology standards such as Bluetooth® or the IEEE 802.11 standards. Accelerometers have been incorporated into mobile devices to enable applications such as intelligent user interface applications that let users input commands through gestures, and orientation applications which can automatically change the display from portrait to landscape when the mobile device is rotated. An accelerometer can be provided, e.g., by a micro-electromechanical system (MEMS) which is a tiny mechanical device (of micrometer dimensions) built onto a semiconductor chip. Acceleration direction, as well as orientation, vibration, and shock can be sensed. The one or more processors 8312 further communicate with a ringer/vibrator 8316, a user interface keypad/screen 8318, a speaker 8320, a microphone 8322, a camera 8324, a light sensor 8326, and a temperature sensor 8328. The user interface keypad/screen may include a touch-sensitive screen display.

The one or more processors 8312 controls transmission and reception of wireless signals. During a transmission mode, the one or more processors 8312 provide voice signals from microphone 8322, or other data signals, to the RF transmitter/receiver 8306. The transmitter/receiver 8306 transmits the signals through the antenna 8302. The ringer/vibrator 8316 is used to signal an incoming call, text message, calendar reminder, alarm clock reminder, or other notification to the user. During a receiving mode, the RF transmitter/receiver 8306 receives a voice signal or data signal from a remote station through the antenna 8302. A received voice signal is provided to the speaker 8320 while other received data signals are processed appropriately.

Additionally, a physical connector 8388 may be used to connect the mobile device 8300 to an external power source, such as an AC adapter or powered docking station, in order to recharge battery 8304. The physical connector 8388 may also be used as a data connection to an external computing device. For example, the data connection may allow for operations such as synchronizing mobile device data with the computing data on another device.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

For purposes of this document, reference in the specification to "an embodiment," "one embodiment," "some embodiments," or "another embodiment" are used to described different embodiments and do not necessarily refer to the same embodiment.

For purposes of this document, a connection can be a direct connection or an indirect connection (e.g., via another part).

For purposes of this document, the term "set" of objects, refers to a "set" of one or more of the objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for enhancing a live video communication, comprising:
   transmitting a live video stream to a plurality of computing devices, the plurality of computing devices is associated with a plurality of persons;
   detecting that two or more persons of the plurality of persons have stopped paying attention to the live video stream;
   generating an alert in response to detecting that the two or more persons have stopped paying attention to the live video stream; and
   transmitting the alert to a first computing device of the plurality of computing devices associated with a first person of the two or more persons.

2. The method of claim 1, further comprising:
   identifying an age associated with the first person, the generating an alert comprises generating the alert based on the age associated with the first person.

3. The method of claim 2, wherein:
   the alert comprises a displaying of an animation to the first person if the age is less than a particular age.

4. The method of claim 2, further comprising:
   identifying a gender associated with the first person, the generating an alert comprises generating the alert based on the age and the gender associated with the first person.

5. The method of claim 1, wherein:
   the detecting that two or more persons of the plurality of persons have stopped paying attention to the live video stream comprises applying gaze detection techniques to images of the two or more persons of the plurality of persons captured during transmission of the live video stream.

6. The method of claim 1, further comprising:
   transmitting a test question to the first computing device in response to detecting that the two or more persons have stopped paying attention to the live video stream;
   acquiring an answer from the first computing device regarding the test question; and
   transmitting a second alert to a second computing device associated with a second person if the answer to the test question is incorrect.

7. The method of claim 6, wherein:
   the live video stream comprises a real-time video lecture; and
   the second person comprises a lecturer associated with the real-time video lecture.

8. The method of claim 6, wherein:
   the transmitting a second alert to a second computing device comprises transmitting the second alert to the second computing device if a threshold number of the two or more persons have answered the test question incorrectly.

9. The method of claim 1, further comprising:
   pausing the transmission of the live video stream to computing devices of the plurality of computing devices associated with the two or more persons in response to detecting that the two or more persons have stopped paying attention to the live video stream.

10. A system, comprising:
    a storage device, the storage device stores a user profile associated with a first person of a plurality of persons, the plurality of persons is associated with a plurality of computing devices; and
    a processor in communication with the storage device, the processor transmits a live video stream to the plurality of computing devices, the processor detects that two or more persons of the plurality of persons have stopped paying attention to the live video stream, the two or more persons include the first person, the processor generates an alert in response to detecting that the two or more persons have stopped paying attention to the live video stream, the processor causes the alert to be transmitted to a first computing device of the plurality of computing devices associated with the first person.

11. The system of claim 10, wherein:
the processor identifies an age associated with the first person, the processor generates the alert based on the age associated with the first person.

12. The system of claim 11, wherein:
the alert comprises a displaying of an animation to the first person if the age is less than a particular age.

13. A computer program product, comprising:
a computer readable storage medium having computer readable program code embodied therewith, the computer readable program code comprising:
computer readable program code configured to transmit a live video stream to a plurality of computing devices, the plurality of computing devices is associated with a plurality of persons;
computer readable program code configured to detect that two or more persons of the plurality of persons have stopped paying attention to the live video stream;
computer readable program code configured to generate an alert in response to detecting that the two or more persons have stopped paying attention to the live video stream; and
computer readable program code configured to transmit the alert to a first computing device of the plurality of computing devices associated with a first person of the two or more persons.

14. The computer program product of claim 13, further comprising:
computer readable program code configured to identify an age associated with the first person, the processor generates the alert based on the age associated with the first person.

15. The computer program product of claim 14, wherein:
the alert comprises a displaying of an animation to the first person if the age is less than a particular age.

16. The computer program product of claim 14, further comprising:
computer readable program code configured to identify a gender associated with the first person, the processor generates the alert based on the age and the gender associated with the first person.

17. The computer program product of claim 13, wherein:
the processor detects that the two or more persons of the plurality of persons have stopped paying attention to the live video stream by applying gaze detection techniques to images of the two or more persons of the plurality of persons captured during transmission of the live video stream.

18. The computer program product of claim 13, further comprising:
computer readable program code configured to transmit a test question to the first computing device in response to detecting that the two or more persons have stopped paying attention to the live video stream;
computer readable program code configured to acquire an answer from the first computing device regarding the test question; and
computer readable program code configured to transmit a second alert to a second computing device associated with a second person if the answer to the test question is incorrect.

19. The computer program product of claim 18, wherein:
the live video stream comprises a real-time video lecture; and
the second person comprises a lecturer associated with the real-time video lecture.

20. The computer program product of claim 13, further comprising:
computer readable program code configured to pause the transmission of the live video stream to computing devices of the plurality of computing devices associated with the two or more persons in response to detecting that the two or more persons have stopped paying attention to the live video stream.

* * * * *